(12) United States Patent
D'Souza et al.

(10) Patent No.: US 12,105,881 B2
(45) Date of Patent: Oct. 1, 2024

(54) ON-SCREEN KEYBOARD USER INTERFACE WITH CONTEXT-AWARE HAPTIC FEEDBACK

(71) Applicant: QUALCOMM Incorporated, San Diego, CA (US)

(72) Inventors: Sandeep Louis D'Souza, San Diego, CA (US); Raj Kumar, San Diego, CA (US); Deepak Rajendra Karnik, San Diego, CA (US); Reid Westburg, Del Mar, CA (US); Krishna Buska, San Diego, CA (US); William Scofield, San Diego, CA (US); George Issa Saman, San Diego, CA (US); Seong Jun Ma, San Diego, CA (US); Hui-Ya Liao Nelson, San Diego, CA (US); Eddie Choy, Carlsbad, CA (US); Livingstone Song, San Diego, CA (US); Louis Dominic Oliveira, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/148,006

(22) Filed: Dec. 29, 2022

(65) Prior Publication Data
US 2024/0220019 A1    Jul. 4, 2024

(51) Int. Cl.
| G06F 3/16 | (2006.01) |
| G06F 3/01 | (2006.01) |
| G06F 3/041 | (2006.01) |
| G06F 3/04842 | (2022.01) |
| G06F 3/04886 | (2022.01) |

(52) U.S. Cl.
CPC ............ *G06F 3/016* (2013.01); *G06F 3/0414* (2013.01); *G06F 3/04842* (2013.01); *G06F 3/04886* (2013.01); *G06F 2203/014* (2013.01); *G06F 2203/04105* (2013.01)

(58) Field of Classification Search
CPC .... G06F 3/016; G06F 3/0414; G06F 3/04842; G06F 3/04886; G06F 2203/014; G06F 2203/04105
See application file for complete search history.

(56) References Cited

U.S. PATENT DOCUMENTS

| 11,093,048 B1* | 8/2021 | Knoppert | G06F 3/0233 |
| 11,126,283 B2* | 9/2021 | Chen | G06F 3/0416 |

(Continued)

FOREIGN PATENT DOCUMENTS

| EP | 3179358 A1 | 6/2017 |
| WO | 2010009552 A1 | 1/2010 |

OTHER PUBLICATIONS

International Search Report and Written Opinion—PCT/US2023/036423—ISA/EPO—Feb. 5, 2024.

*Primary Examiner* — David E Choi
(74) *Attorney, Agent, or Firm* — QUALCOMM Incorporated

(57) ABSTRACT

In some aspects, an electronic device may display a keyboard user interface on a touchscreen display panel. The electronic device may detect a key press interaction with the keyboard user interface. The electronic device may trigger one or more haptic actuators to generate a vibration waveform associated with a haptic pattern that is based at least in part on a context associated with the key press interaction. Numerous other aspects are described.

30 Claims, 12 Drawing Sheets

(56) References Cited

U.S. PATENT DOCUMENTS

| | | | |
|---|---|---|---|
| 11,614,793 B2* | 3/2023 | O'Keefe | G06F 3/014 |
| | | | 345/156 |
| 2014/0002346 A1* | 1/2014 | Weddle | G06F 3/016 |
| | | | 345/156 |
| 2014/0055358 A1* | 2/2014 | Birnbaum | G06F 3/016 |
| | | | 345/173 |
| 2014/0362014 A1* | 12/2014 | Ullrich | G06F 3/0488 |
| | | | 345/173 |
| 2016/0147333 A1* | 5/2016 | Levesque | H04M 1/0268 |
| | | | 345/161 |
| 2017/0011210 A1* | 1/2017 | Cheong | A61B 5/681 |
| 2018/0074694 A1 | 3/2018 | Lehmann et al. | |
| 2018/0089166 A1* | 3/2018 | Meyer | G06F 3/04842 |
| 2019/0011402 A1* | 1/2019 | Kinoshita | G01N 29/48 |
| 2019/0064997 A1 | 2/2019 | Wang et al. | |
| 2019/0079584 A1* | 3/2019 | Bonanno | G06F 3/03543 |
| 2019/0302889 A1* | 10/2019 | Salada | G06F 3/0416 |
| 2021/0089126 A1* | 3/2021 | Nickerson | G06V 40/1306 |
| 2021/0240268 A1* | 8/2021 | Knoppert | G06F 3/03547 |
| 2021/0325973 A1* | 10/2021 | Knoppert | G06F 1/1616 |
| 2021/0397263 A1 | 12/2021 | Moussette et al. | |
| 2022/0308669 A1* | 9/2022 | Beck | G06F 3/016 |
| 2022/0415499 A1* | 12/2022 | Talmor | G16H 50/20 |
| 2023/0143709 A1* | 5/2023 | Lorenz | G06F 3/03547 |
| | | | 345/169 |

* cited by examiner

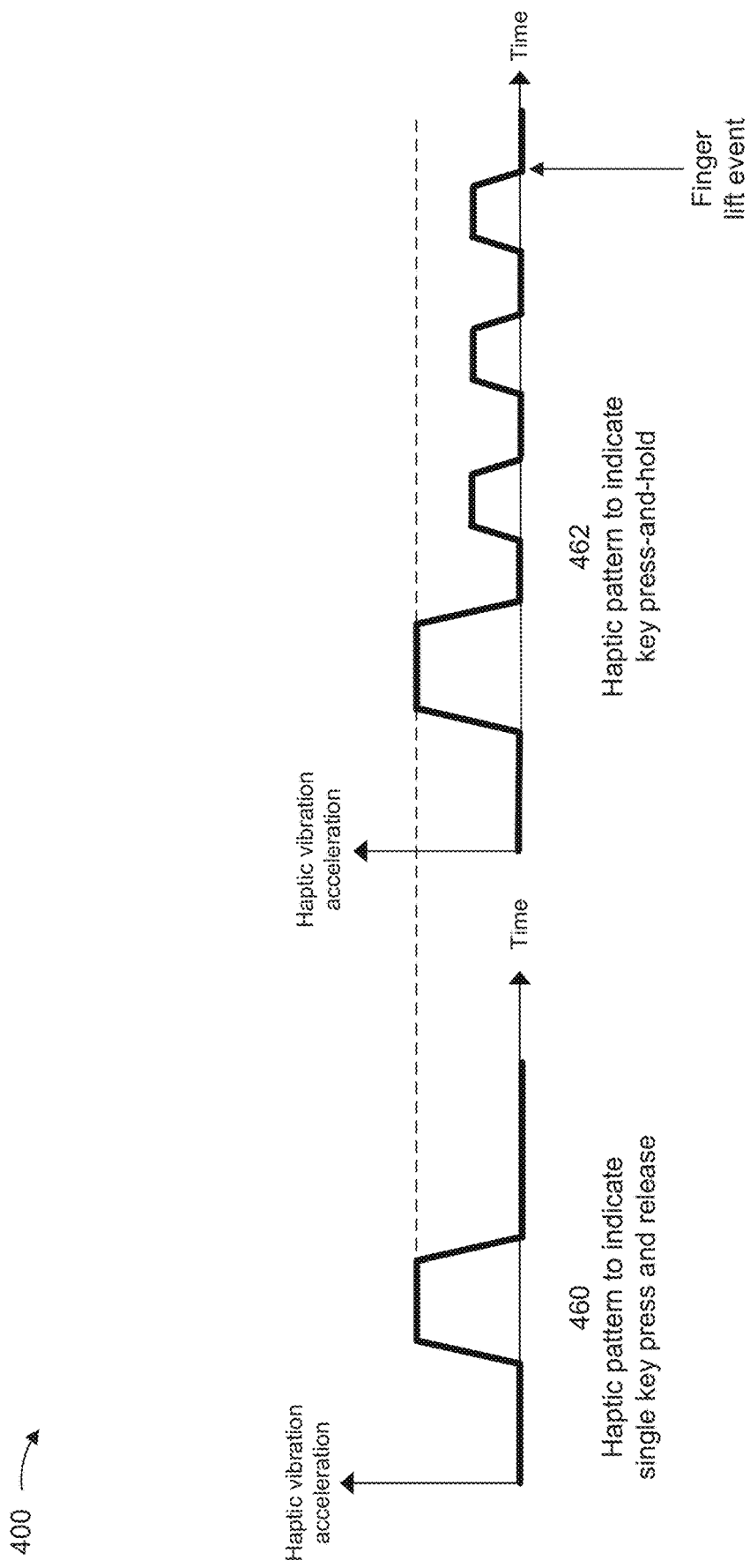

ON-SCREEN KEYBOARD USER INTERFACE WITH CONTEXT-AWARE HAPTIC FEEDBACK

FIELD OF THE DISCLOSURE

Aspects of the present disclosure generally relate to an on-screen keyboard user interface and, for example, to providing context-aware haptic feedback to a user interacting with an on-screen keyboard user interface.

BACKGROUND

Haptic technology, sometimes referred to as kinesthetic technology or three-dimensional (3D) touch technology, refers to technology that can create an experience of touch (e.g., a tactile experience) by applying forces, vibrations, motions, or other feedback (e.g., physical or mechanical outputs) that produce user-perceptible tactile sensations. For example, haptic technologies can be used to simulate a sensation of touching an object in a virtual environment (e.g., in an extended reality application), may be used to provide haptic feedback or tactile indications in a control system, and/or may be used to provide a physical or tactile element to music, among many other use cases. In some cases, haptic technologies may incorporate tactile sensors that can measure forces that a user exerts on an interface and/or may incorporate tactile actuators that can generate forces that a user perceives on an interface.

SUMMARY

Some aspects described herein relate to a method performed by an electronic device. The method may include displaying a keyboard user interface on a touchscreen display panel. The method may include detecting a key press interaction with the keyboard user interface. The method may include triggering one or more haptic actuators to generate a vibration waveform associated with a haptic pattern that is based at least in part on a context associated with the key press interaction.

Some aspects described herein relate to an electronic device. The electronic device may include a memory and one or more processors coupled to the memory. The one or more processors may be configured to display a keyboard user interface on a touchscreen display panel. The one or more processors may be configured to detect a key press interaction with the keyboard user interface. The one or more processors may be configured to trigger one or more haptic actuators to generate a vibration waveform associated with a haptic pattern that is based at least in part on a context associated with the key press interaction.

Some aspects described herein relate to a non-transitory computer-readable medium that stores a set of instructions. The set of instructions, when executed by one or more processors of an electronic device, may cause the electronic device to display a keyboard user interface on a touchscreen display panel. The set of instructions, when executed by one or more processors of the electronic device, may cause the electronic device to detect a key press interaction with the keyboard user interface. The set of instructions, when executed by one or more processors of the electronic device, may cause the electronic device to trigger one or more haptic actuators to generate a vibration waveform associated with a haptic pattern that is based at least in part on a context associated with the key press interaction.

Some aspects described herein relate to an apparatus. The apparatus may include means for displaying a keyboard user interface on a touchscreen display panel. The apparatus may include means for detecting a key press interaction with the keyboard user interface. The apparatus may include means for triggering one or more haptic actuators to generate a vibration waveform associated with a haptic pattern that is based at least in part on a context associated with the key press interaction.

Aspects generally include a method, apparatus, system, computer program product, non-transitory computer-readable medium, electronic device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A-4F are diagrams illustrating examples associated with an on-screen keyboard user interface associated with context-aware haptic feedback, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Figure 1:
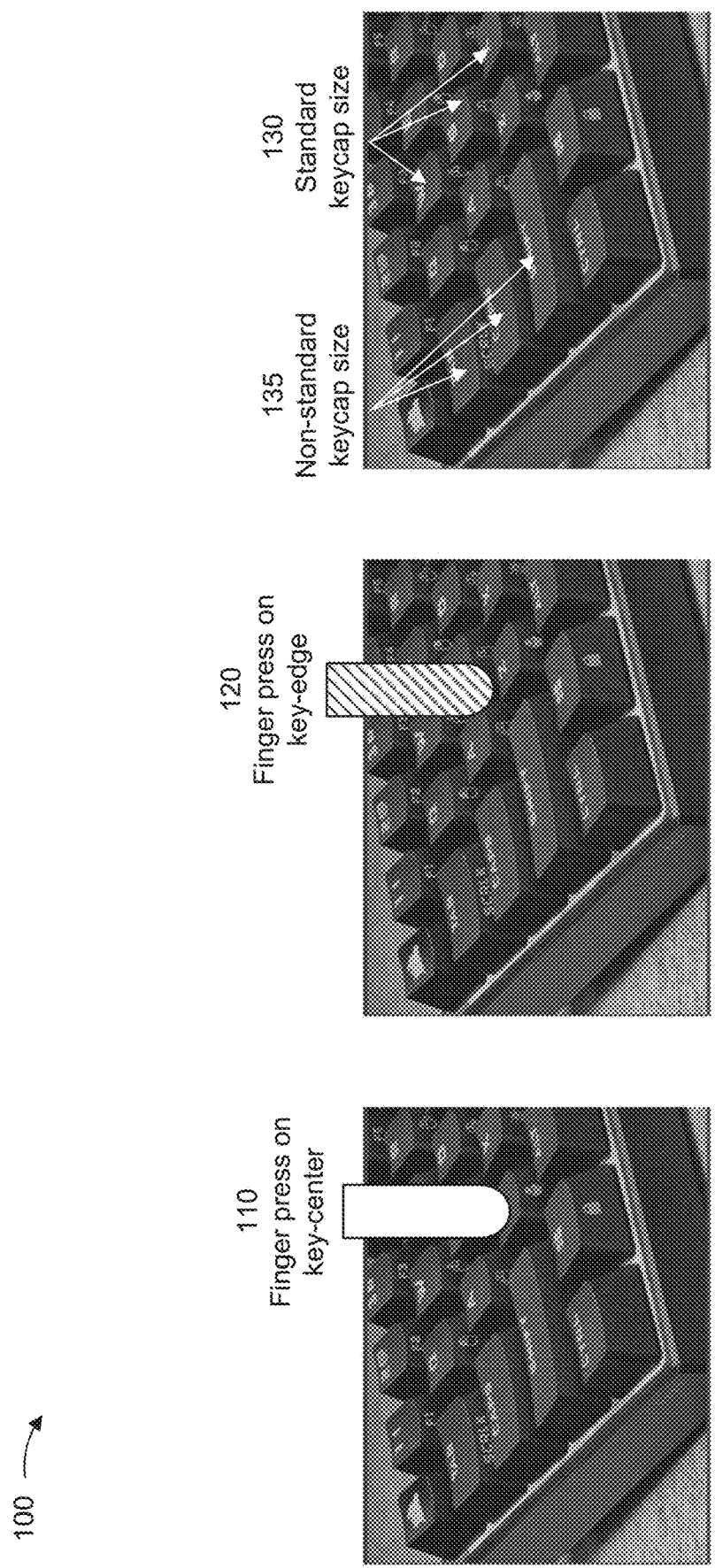
FIG. 1 is a diagram illustrating examples of tactile feedback that may be provided by a physical keyboard device, in accordance with the present disclosure.

FIG. 1 is a diagram illustrating examples 100 of tactile feedback that may be provided by a physical keyboard device, in accordance with the present disclosure.

Mobile electronic devices typically display an on-screen keyboard user interface to allow a user to support data input or data entry through typing. For example, the on-screen keyboard user interface may be displayed on a touchscreen display panel equipped with capacitive sensor or other suitable mechanism to map a keyboard interaction to a key associated with the on-screen keyboard user interface. Although the specific layout in an onscreen keyboard user interface may vary (e.g., an alphabet layout may be used for entering text, a button may be provided to toggle between the alphabet layout and a numbers and punctuation layout, an email layout may include "@" or ".com" keys for entering email addresses, or the like), on-screen keyboard user interfaces generally imitate or mimic the QWERTY layout typically used in a physical keyboard device. However, mobile electronic devices typically have a small screen with limited space to display the on-screen keyboard user interface, which can pose challenges to a user attempting to type using the on-screen keyboard user interface despite advances such as support for swipe typing.

For example, physical keyboard devices are often designed to provide differentiated mechanical or tactile feedback to improve typing accuracy and/or reduce the visual attention needed to type or retype. For example, referring to FIG. 1, reference number 110 depicts an example of tactile feedback that may be provided when a user presses a key center, where each key on a keyboard may have a profile that allows the user to know when the center of a target key was pressed (e.g., a key may have contours that intuitively guide the user to press on the center of the key). In a similar respect, reference number 120 depicts an example of tactile feedback that may be provided when a user presses a key edge or a crevice between adjacent keys, which may have a different tactile feel than a press on a key center (e.g., there is typically a distance of about 5 millimeters (mm) between switch holes of adjacent keys on a physical keyboard device). In this way, a physical keyboard device provides tactile or mechanical feedback that allows the user to know if a key was pressed correctly (e.g., in the key center rather than the key edge or boundary between adjacent keys). Furthermore, the user of a physical keyboard device can sense whether a key was correctly pressed or mispressed (e.g., based on resistance when a key is mispressed or stuck). On the other hand, for a typical on-screen keyboard user interface, a user needs to visually inspect what is typed and retype to correct for a mistyped letter or character. In some cases, the need for the user to be visually attentive to the on-screen keyboard user interface can pose safety hazards because the user may be unaware of or distracted from events occurring in the environment around them.

In another example, as shown by reference numbers 130 and 135, a physical keyboard device typically includes various keys with standard keycap sizes and various keys with non-standard (e.g., larger) keycap sizes. For example, a standard keycap size on a typical physical keyboard device is approximately 18 mm wide, which is defined as one (1) unit, which may be abbreviated as 1u, and the standard 1u keycap size is usually used for alphanumeric characters (e.g., A-Z and 0-9) and various punctuation keys (e.g., commas, periods, brackets, dashes, or the like). Furthermore, larger keycap sizes may be used for special keys or modifier keys, such as 1.25$u$ for a control and/or alt key, 1.5u for a tab key, 2u for a backspace key, 6.25u for a spacebar key, or the like, which may refer to multiplicative scaling factors that are applied to the width of the standard keycap size (e.g., a spacebar key with a keycap size of 6.25u may have a width of about 112.5 mm on a keyboard where a standard 1u keycap size is 18 mm). In this way, the variability in the keycap sizes used on a physical keyboard device allows the user to distinguish between keys with standard keycap sizes and the special keys with larger keycap sizes with little or no visual attention. In contrast, in a typical on-screen keyboard user interface, there is no mechanical or physical feedback to differentiate between keys having different keycap sizes or keys that have special functions. Rather, to the extent that electronic devices currently provide any tactile or mechanical feedback to the user, the feedback is limited to simple haptic vibrations to acknowledge a key press rather than providing any feedback to indicate a context associated with the key press. Furthermore, in some cases, special keys that have non-standard (e.g., larger) keycap sizes on a typical physical keyboard device may have standard keycap sizes in an on-screen keyboard user interface.

Some aspects described herein relate to techniques to provide context-aware haptic feedback to a user based on a context associated with a keyboard interaction with an on-screen keyboard user interface. For example, in some aspects, an electronic device may be configured to render vibrational waveforms associated with different haptic patterns during keyboard interactions with an on-screen keyboard user interface, which may reduce the visual attention required from the user when typing or retyping and/or provide more immediate feedback regarding typing accuracy during on-screen keyboard interactions. For example, in some aspects, a context associated with a keyboard interaction with an on-screen keyboard user interface may be detected through a touchscreen controller, a force sensor, previously typed characters, and/or an active application, and different context-aware haptic waveforms may be used to provide tactile feedback regarding the keyboard interaction. For example, in some aspects, the context-aware vibrational waveforms or haptic waveforms may be used to indicate or acknowledge a key press on a key center, a key press on a key edge or boundary between adjacent keys, selection of a special key (e.g., shift, tab, caps lock, space bar, or the like), a space to be added after the final character in a typed word, a press-and-hold on a specific key, an/or an automatic switch between upper and lower cases. Additionally, or alternatively, in some aspects, the electronic device may be configured to render force-aware haptic feedback to help guide and train a user regarding the correct amount of force and finger contact to be applied when interacting with the on-screen keyboard user interface, which may reduce user typing fatigue, reduce incorrect key presses or mispresses, and/or otherwise improve a user experience during interactions with an on-screen keyboard user interface.

As indicated above, FIG. 1 is provided as an example. Other examples may differ from what is described with regard to FIG. 1.

Figure 2:
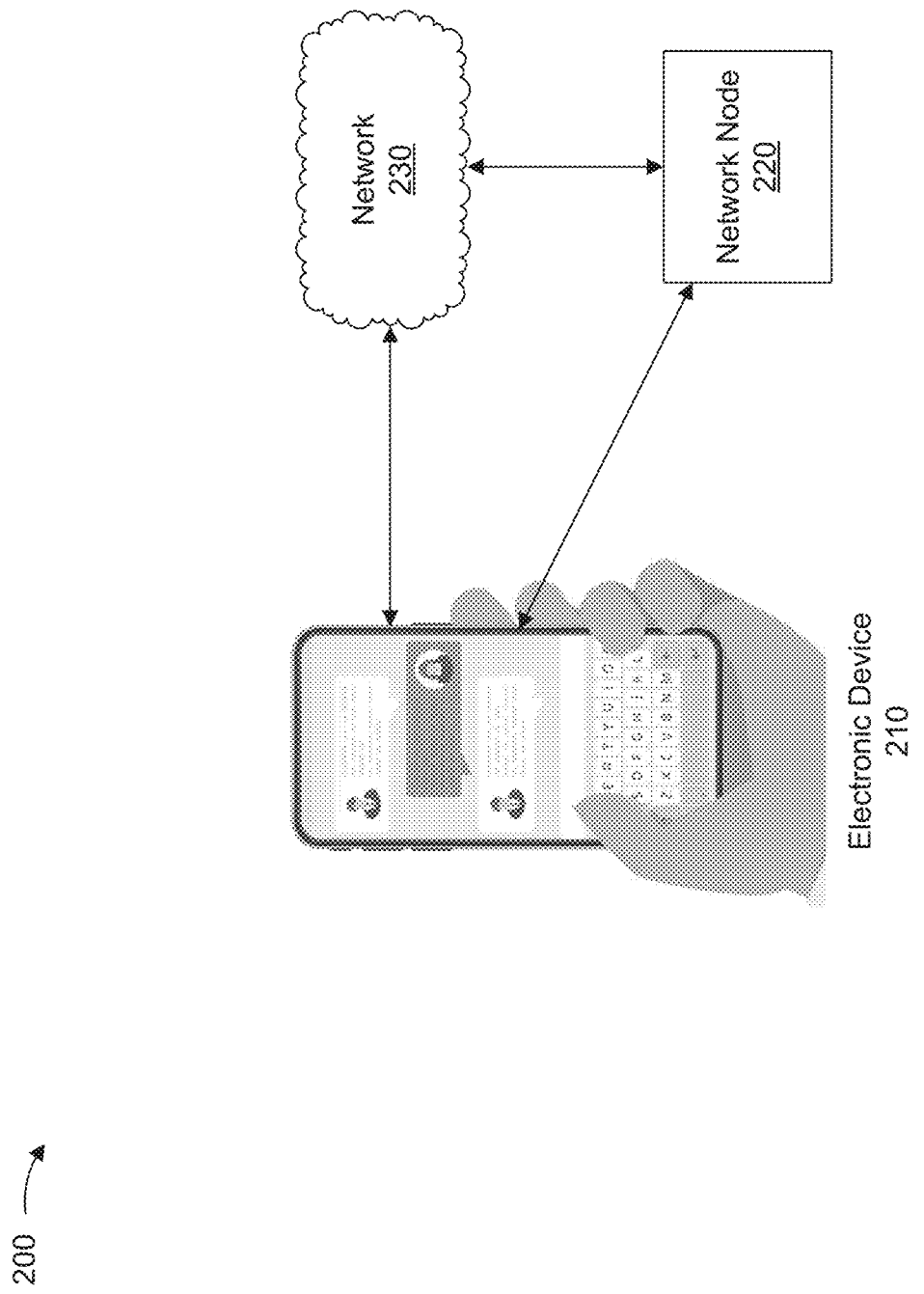
FIG. 2 is a diagram illustrating an example environment in which an on-screen keyboard user interface associated with context-aware haptic feedback may be implemented, in accordance with the present disclosure.

FIG. 2 is a diagram illustrating an example environment 200 in which an on-screen keyboard user interface associated with context-aware haptic feedback may be implemented, in accordance with the present disclosure. As shown in FIG. 2, the environment 200 may include an electronic device 210, a network node 220, and a network 230. Devices of the environment 200 may interconnect via wired connections, wireless connections, or a combination of wired and wireless connections.

The electronic device 210 includes one or more devices capable of rendering context-aware haptic feedback based on an interaction with an on-screen keyboard user interface displayed on the electronic device 210. For example, as shown, the electronic device 210 may include a touchscreen display panel or other suitable interface that can display an on-screen keyboard user interface. Furthermore, although not explicitly shown in FIG. 2, the electronic device 210 may include one or more sensors that can detect an interaction with the on-screen keyboard user interface and one or more actuators that can generate a vibration waveform associated with a haptic pattern that is based at least in part on a context associated with the key press interaction. For example, in some aspects, the electronic device 210 may include a wired and/or wireless communication and/or computing device equipped with appropriate display, sensor, and actuator components, such as a user equipment (UE), a mobile phone (e. g., a smart phone, a radiotelephone, and/or the like), a laptop computer, a tablet computer, a handheld computer, a desktop computer, a gaming device, a wearable communication device (e.g., a smart wristwatch or a pair of smart eyeglasses), or the like.

The network node 220 includes one or more devices capable of receiving, generating, storing, processing, and/or providing information related interaction with an on-screen keyboard user interface displayed on the electronic device 210. For example, the network node 220 may include a base station (a Node B, a gNB, and/or a 5G node B (NB), among other examples), a UE, a relay device, a network controller, an access point, a transmit receive point (TRP), an apparatus, a device, a computing system, one or more components of any of these, and/or another processing entity configured to perform one or more aspects of the techniques described herein. For example, the network node 220 may be an aggregated base station and/or one or more components of a disaggregated base station that can receive data that a user enters into the electronic device 210 using a keyboard user interface that supports context-aware haptic feedback, transmit data to configure the context-aware haptic feedback rendered on the electronic device 210, or the like.

The network 230 includes one or more wired and/or wireless networks. For example, the network 230 may include a cellular network (e.g., a Long-Term Evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
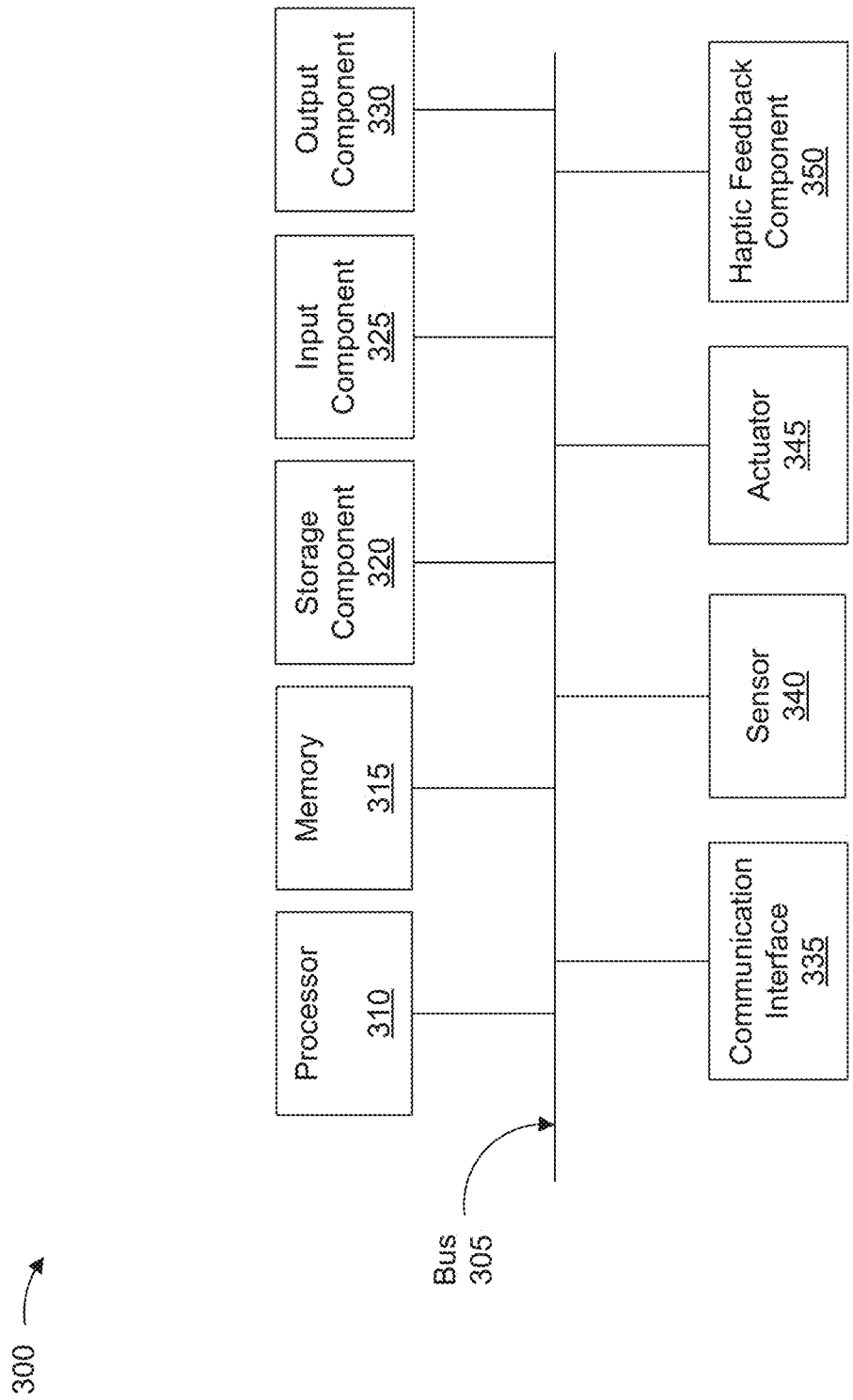
FIG. 3 is a diagram illustrating example components of one or more devices shown in FIG. 2, such as an electronic device that may render an on-screen keyboard user interface associated with context-aware haptic feedback, in accordance with the present disclosure.

FIG. 3 is a diagram illustrating example components of a device 300, in accordance with the present disclosure. In some aspects, the device 300 may correspond to the electronic device 210 and/or the network node 220 shown in FIG. 2. In some aspects, the electronic device 210 and/or the network node 220 may include one or more devices 300 and/or one or more components of device 300. As shown in FIG. 3, device 300 may include a bus 305, a processor 310, a memory 315, a storage component 320, an input component 325, an output component 330, a communication interface 335, a sensor 340, an actuator 345, and/or a haptic feedback component 350.

Bus 305 includes a component that permits communication among the components of device 300. Processor 310 is implemented in hardware, firmware, or a combination of hardware and software. Processor 310 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touchscreen display, a keyboard, a keypad, a mouse, a button, a switch, and/or a microphone). Additionally, or alternatively, input component 325 may include a component for determining a position or a location of device 300 (e.g., a global positioning system (GPS) component or a global navigation satellite system (GNSS) component) and/or a sensor for sensing information (e.g., an accelerometer, a gyroscope, or another type of position or environment sensor). Output component 330 includes a component that provides output information from device 300 (e.g., a display, a speaker, and/or an audio or visual indicator).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

The sensor 340 includes one or more wired or wireless devices capable of receiving, generating, storing, transmitting, processing, detecting, and/or providing information associated with a state of the device 300 and/or an environment surrounding the device 300, as described elsewhere herein. For example, the sensor 340 may include a touchscreen controller, a force sensor, a motion sensor, an accelerometer, a gyroscope, a proximity sensor, a light sensor, a noise sensor, a pressure sensor, an ultrasonic sensor, a positioning sensor, a capacitive sensor, a timing device, an infrared sensor, an active sensor (e.g., requiring an external power signal), a passive sensor (e.g., not requiring an external power signal), a biological or biometric sensor, a smoke sensor, a gas sensor, a chemical sensor, an alcohol sensor, a temperature sensor, a moisture sensor, a humidity sensor, a radioactive sensor, a magnetic sensor, an electromagnetic sensor, an analog sensor, and/or a digital sensor, among other examples. The sensor 340 may sense or detect a condition or information related to a state of the device 300 and/or an environment surrounding the device 300 and transmit, using a wired or wireless communication interface, an indication of the detected condition or information to other components of the device 300 and/or other devices.

The actuator 345 includes one or more devices capable of receiving, generating, storing, transmitting, processing, detecting, and/or providing information associated with a state of the device 300 and/or an environment surrounding the device 300, as described elsewhere herein. For example, the actuator 345 may include a haptic actuator, such as a linear resonant actuator (LRA), an eccentric rotating mass (ERM) vibration motor, a piezoelectric actuator, an ultrasonic or electrostatic-friction-modulation surface actuator, and/or another suitable device or combination of devices configured to generate a vibrational waveform or other mechanical feedback with a distinct mechanical haptic pattern (e.g., based on a context associated with an interaction with an on-screen keyboard user interface).

The haptic feedback component 350 includes one or more devices capable of receiving, generating, storing, transmitting, processing, detecting, and/or providing context-aware haptic feedback based on an interaction with an on-screen keyboard user interface, as described elsewhere herein. In some aspects, the haptic feedback component 350 may include a haptic actuator driver or other suitable device that can drive the actuator 345. For example, in some aspects, the haptic feedback component 350 may display a keyboard user interface on a touchscreen display panel associated with the output component 330, may detect a key press interaction with the keyboard user interface based on information sensed with the one or more sensors 340, and may trigger one or more actuators 345 to generate a vibration waveform associated with a haptic pattern that is based at least in part on a context associated with the key press interaction.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 300 includes means for performing one or more processes described herein and/or means for performing one or more operations of the processes described herein. For example, device 300 may include means for displaying a keyboard user interface, means for detecting a key press interaction with the keyboard user interface, and/or means for triggering one or more haptic actuators to generate a vibration waveform associated with a haptic pattern that is based at least in part on a context associated with the key press interaction. In some aspects, such means may include one or more components of device 300 described in connection with FIG. 3, such as bus 305, processor 310, memory 315, storage component 320, input component 325, output component 330, communication interface 335, sensor 340, actuator 345, and/or haptic feedback component 350.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
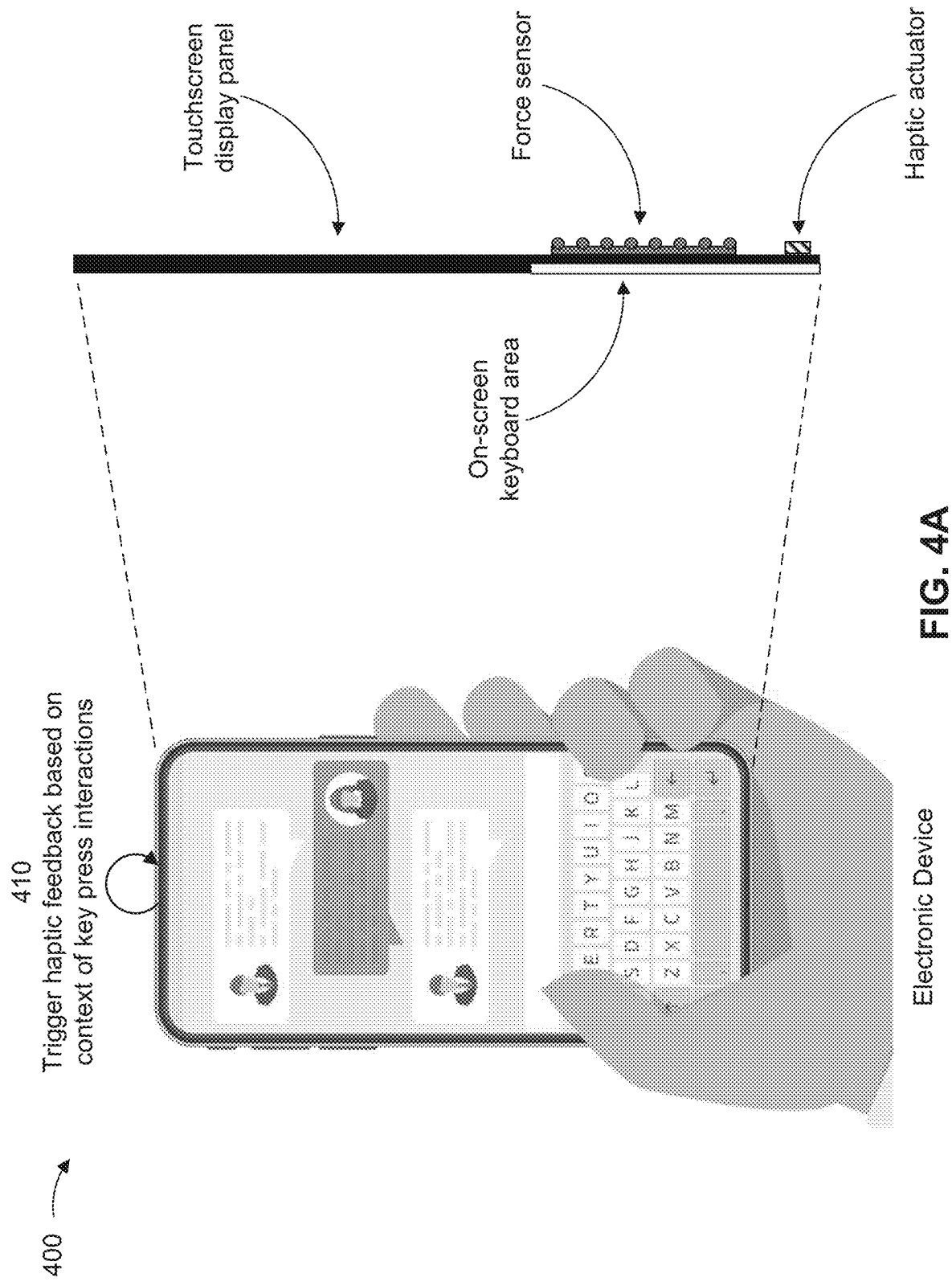

FIGS. 4A-4F are diagrams illustrating examples 400 associated with an on-screen keyboard user interface associated with context-aware haptic feedback, in accordance with the present disclosure. As shown in FIG. 4A, examples 400 may be performed by any suitable electronic device that includes a touchscreen display panel and an on-screen keyboard area in which to display or otherwise render an on-screen keyboard user interface. For example, in FIG. 4A, the on-screen keyboard user interface is displayed in the on-screen keyboard area of the touchscreen display panel in a portrait mode, although it will be appreciated that examples 400 can also be suitably applied when the on-screen keyboard user interface is displayed in a landscape mode. Furthermore, although FIG. 4A illustrates an alphabet layout for the on-screen keyboard user interface, it will be appreciated that examples 400 can also be suitably applied to other keyboard layouts (e.g., a decimal pad layout, a numbers and punctuation layout, an email address layout, or the like). As further shown in FIG. 4A, the electronic device includes a force sensor and/or other suitable sensors (e.g., a touchscreen controller) that can detect a location and a force (or pressure) associated with one or more keyboard interactions and one or more haptic actuators that can generate or otherwise render a vibration waveform. For example, in some aspects, the one or more haptic actuators may include an LRA, an ERM vibration motor, a piezoelectric actuator, an ultrasonic or electrostatic-friction-modulation surface actuator, and/or any other suitable device or combination of devices configured to generate a vibration waveform or other mechanical feedback with a distinct mechanical haptic pattern.

As shown by reference number 410 and described in more detail herein, the electronic device may be configured to trigger haptic feedback using the one or more haptic actuators based on a context for one or more keyboard interactions. For example, as described herein, the electronic device may display a keyboard user interface on the touchscreen display panel (e.g., in the on-screen keyboard area, which may vary depending on whether the electronic device is in a portrait or landscape mode), and the electronic device may detect a key press interaction with the keyboard user interface. For example, in some aspects, the context associated with the key press interaction may include a location that is pressed within the on-screen keyboard user interface, which may be detected using a touchscreen controller, an amount of force or pressure that was used to press the location within the on-screen keyboard user interface, which may be detected using the force sensor, and/or a typing context (e.g., previously typed characters and/or an application associated with the keyboard input) that may be detected by one or more processors of the electronic device. Accordingly, in cases where the context associated with a current keyboard interaction relates to a particular event, the one or more haptic actuators may be triggered to generate a vibration waveform associated with a haptic pattern corresponding to the event, which minimizes the visual attention required from the user when typing or retyping and/or otherwise improves a user experience when interacting with the on-screen keyboard user interface.

For example, in some aspects, various keyboard interactions may each be associated with a specific haptic pattern, whereby the vibration waveform generated by the one or more haptic actuators for a current keyboard interaction may provide a user-perceptible tactile indication or acknowledgement regarding the context of the current keyboard interaction. For example, as described in further detail herein with reference to FIGS. 4B-4F, different haptic patterns may be configured to indicate or acknowledge a key press in a key center region, a key press in a key edge region or a boundary region between adjacent keys, an amount of force used in a key press, a key press selecting a special key (e.g., shift, control, tab, space, or the like), a key press with added force to indicate the final character in a typed word, a key press in which a key is pressed and held down for an extended period, and/or an automatic switch or toggle between upper case and lower case (e.g., when typing the first letter in a new sentence and/or switching from the first letter to the second letter of a word). Furthermore, it will be appreciated that although some aspects described herein relate to certain typing contexts that may be associated with specific haptic patterns, the techniques described herein can be applied to any suitable typing context (e.g., a distinct haptic pattern may be rendered when suggested auto-complete words are available and/or when the user selects a key to toggle between different keyboard layouts, such as from an alphabet layout to a number and punctuation layout or an emoji layout, among other examples). Furthermore, in some aspects, the haptic pattern that is associated with a specific typing context may be configurable in various ways (e.g., a user may enable or disable haptic feedback for one or more typing contexts and/or all typing contexts, may enable default haptic patterns or define a custom haptic pattern for one or more typing contexts, and/or may define one or more keyboard interactions or sequences of keyboard interactions as a typing context to be associated with a default or configurable haptic pattern).

Accordingly, as described herein, the electronic device may trigger the one or more haptic actuators to generate the vibration waveform associated with a particular haptic pattern that is configured for a context associated with a current keyboard interaction, which may provide the user with tactile feedback to differentiate various keyboard interactions that may be performed with an on-screen keyboard user interface, with or without added force or pressure. In this way, using the configurable haptic patterns to provide tactile feedback may improve a user experience when interacting with an on-screen keyboard user interface may reduce the visual attention that may be needed from the user while typing (e.g., potentially improving safety by allowing the user to observe and focus on events in a surrounding environment, such as while walking in a busy area), and/or may increase the screen space available to display the on-screen keyboard user interface by removing keys from the on-screen keyboard user interface that may be associated with a force-aware and/or haptic-aware context. Furthermore, in some cases, different haptic actuators and/or different combinations of haptic actuators can be used to differentiate one typing context from another. For example, in some aspects, haptic actuators that may be equipped in an electronic device may include an LRA, an ERM vibration motor, a piezoelectric actuator, an ultrasonic or electrostatic-friction-modulation surface actuator, and/or any other suitable haptic actuator, and one or more of the haptic actuators may be triggered based on the specific typing context and the desired vibration waveform. Furthermore, in cases where multiple haptic actuators are concurrently triggered to generate a composite vibration waveform for a current keyboard interaction, the composite vibration waveform may be divided into different constituents that are rendered using different haptic actuators (e.g., a low-frequency constituent may be provided by an LRA and a high-frequency constituent may be provided by a piezoelectric actuator, among other examples).

In some aspects, in addition to providing haptic feedback to indicate or acknowledge a typing context associated with a keyboard interaction with an on-screen keyboard user interface, the electronic device may trigger one or more haptic actuators to apply force-aware haptic feedback to guide and train a user regarding the correct amount of force and finger contact to be applied when interacting with the on-screen keyboard user interface. For example, some users may press the keyboard display area too hard, which may flatten the fingertip area and potentially result in the user pressing multiple keys and/or misdetections of the intended key press. On the other hand, some users may press the keyboard too lightly, which may result in non-detection of intended keyboard interactions. Accordingly, in some aspects, the electronic device may apply haptic feedback (e.g., via the one or more haptic actuators) to indicate the appropriate amount of force that the user should be applying in a key press, which may reduce key press misdetections or non-detections, reduce user typing fatigue, and/or otherwise improve a user experience when interacting with the on-screen keyboard user interface. For example, in some aspects, the force that is applied when the user performs a key press may be used to change or otherwise modulate the intensity of the vibration waveform that is generated as the haptic feedback. For example, a user key press with a force of about twenty (20) Newtons (e.g., corresponding to about 4.5 pounds or 2 kilograms) may be associated with vibrotactile haptic feedback of 1G (e.g., a haptic vibration that causes the electronic device to have a mechanical acceleration of 9.8 meters per second squared, which is the acceleration caused by gravity).

FIGS. 4B-4F illustrate various examples of specific haptic patterns that may be generated by one or more haptic actuators to provide a user with tactile feedback to indicate or acknowledge a typing context associated with a current keyboard interaction. As shown in FIGS. 4B-4F, each haptic pattern may be rendered as a vibration waveform, where a vertical axis represents an acceleration of a haptic vibration (e.g., in Gs) and a horizontal axis represents time (e.g., in arbitrary units).

Figure 4B:
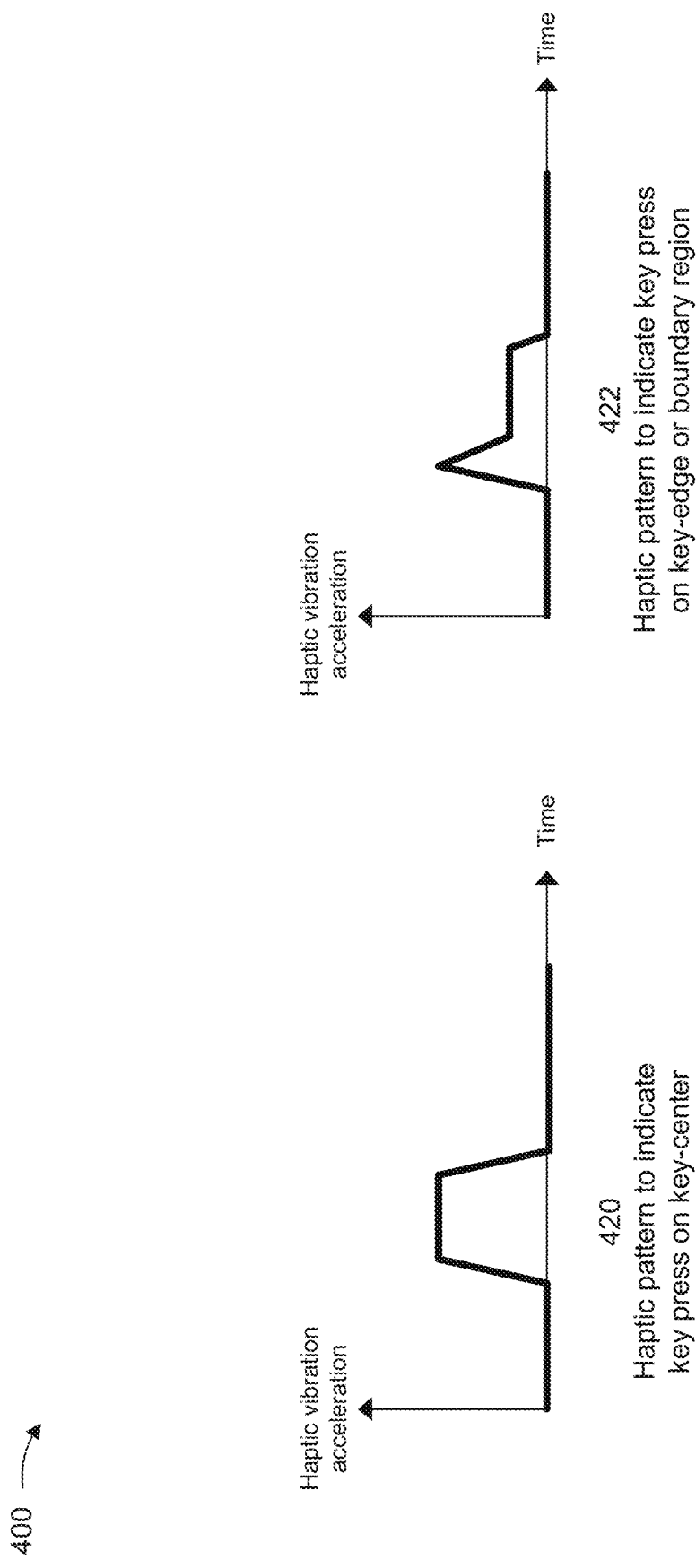

For example, referring to FIG. 4B, reference number 420 depicts a haptic pattern that may be generated to indicate or acknowledge a keyboard interaction that includes a key press in a key center region, and reference number 422 depicts a haptic pattern that may be generated to indicate a keyboard interaction that includes a key press in a key edge region or a boundary region between adjacent keys. For example, in cases where the key press is an accurate press in the center region of a key displayed in the on-screen keyboard user interface, the vibration waveform may be a square or trapezoidal pulse associated with a sharp rise time to a pulse maximum (e.g., a maximum amount of vibrational acceleration), a sustained plateau at the pulse maximum, and a sharp fall time to zero (e.g., no vibrational acceleration). Alternatively, in cases where the key press is in a key edge region or a boundary region between adjacent keys, a different haptic pattern may be generated to indicate a potentially inaccurate press or a mispress. For example, in such cases, the vibration waveform may include an initial rise to a pulse maximum and a subsequent decay to a lower sustained amplitude based. Accordingly, when the key press is in a key edge or boundary region, a triangular accentuation may be provided at the beginning of the vibration waveform followed by a flatter portion at the end of the vibration waveform to emulate the tactile response that may be provided by a physical keyboard device when a user presses a key edge or crevice between adjacent keys.

Figure 4C:
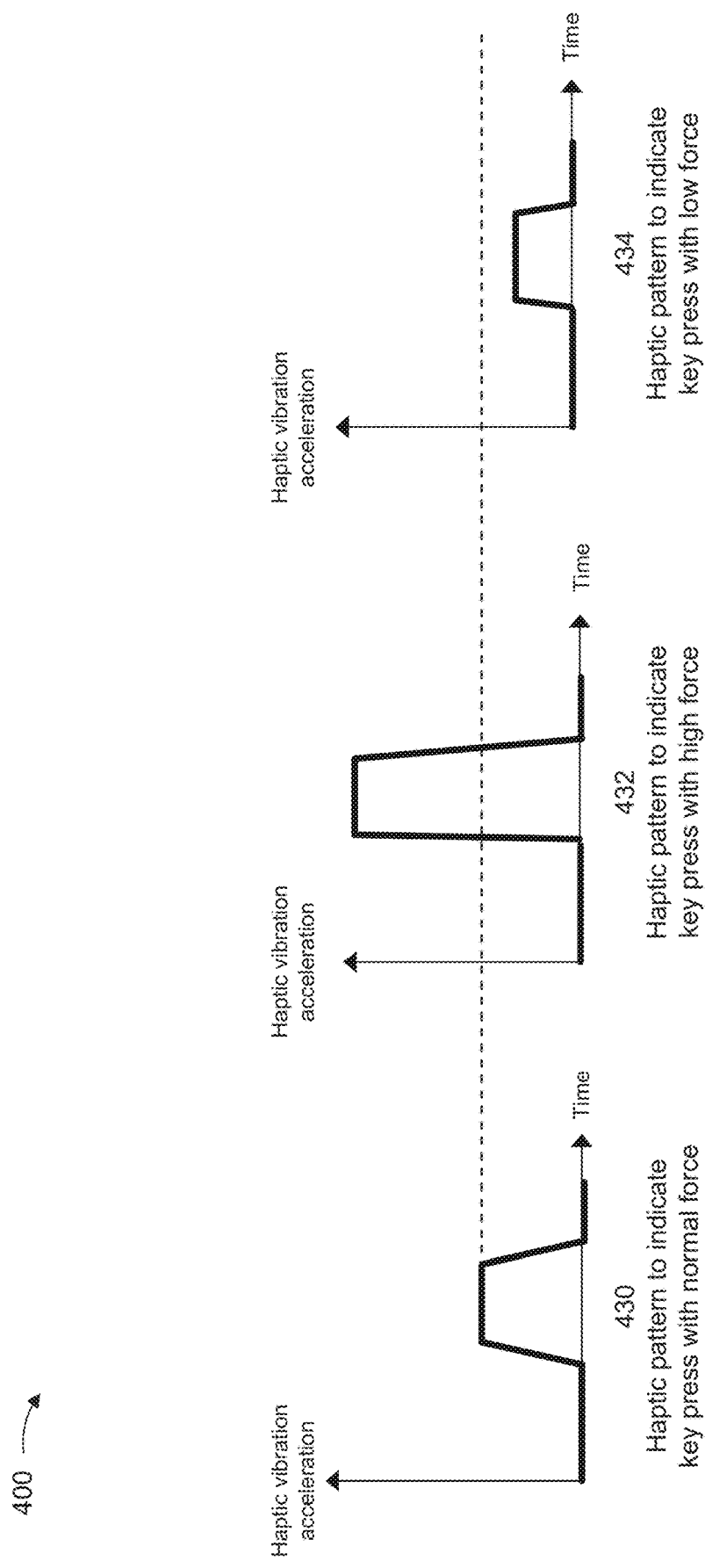

In another example, referring to FIG. 4C, reference numbers 430, 432, and 434 depict different haptic patterns that may be generated to indicate or acknowledge the amount of force used in a current keyboard interaction. For example, when the user presses a key on the on-screen keyboard user interface, the electronic device may measure (e.g., using the force sensor) a force level that the user applied when pressing the key, and an amplitude of the vibration waveform that is rendered by the haptic actuator(s) may depend on the measured force level. For example, as shown by reference number 430, the vibration waveform may have a baseline amplitude when the user applies a normal level of force (e.g., the force level is in a defined range associated with a normal level of force). Alternatively, reference number 432 depicts that the vibration waveform may have an amplitude that is higher than the baseline amplitude when the user applies a high level of force (e.g., the force level is above the defined range associated with the normal level of force), and reference number 434 depicts that the vibration waveform may have an amplitude that is lower than the baseline amplitude when the user applies a low level of force (e.g., the force level is below the defined range associated with the normal level of force). Furthermore, it will be appreciated that in various use cases the vibration waveforms associated with different typing contexts may be combined. For example, if the user presses a key edge or boundary region with a high level of force, the haptic pattern may include an initial accentuation (e.g., as shown by reference number 422 in FIG. 4B) with a relatively higher amplitude.

Figure 4D:
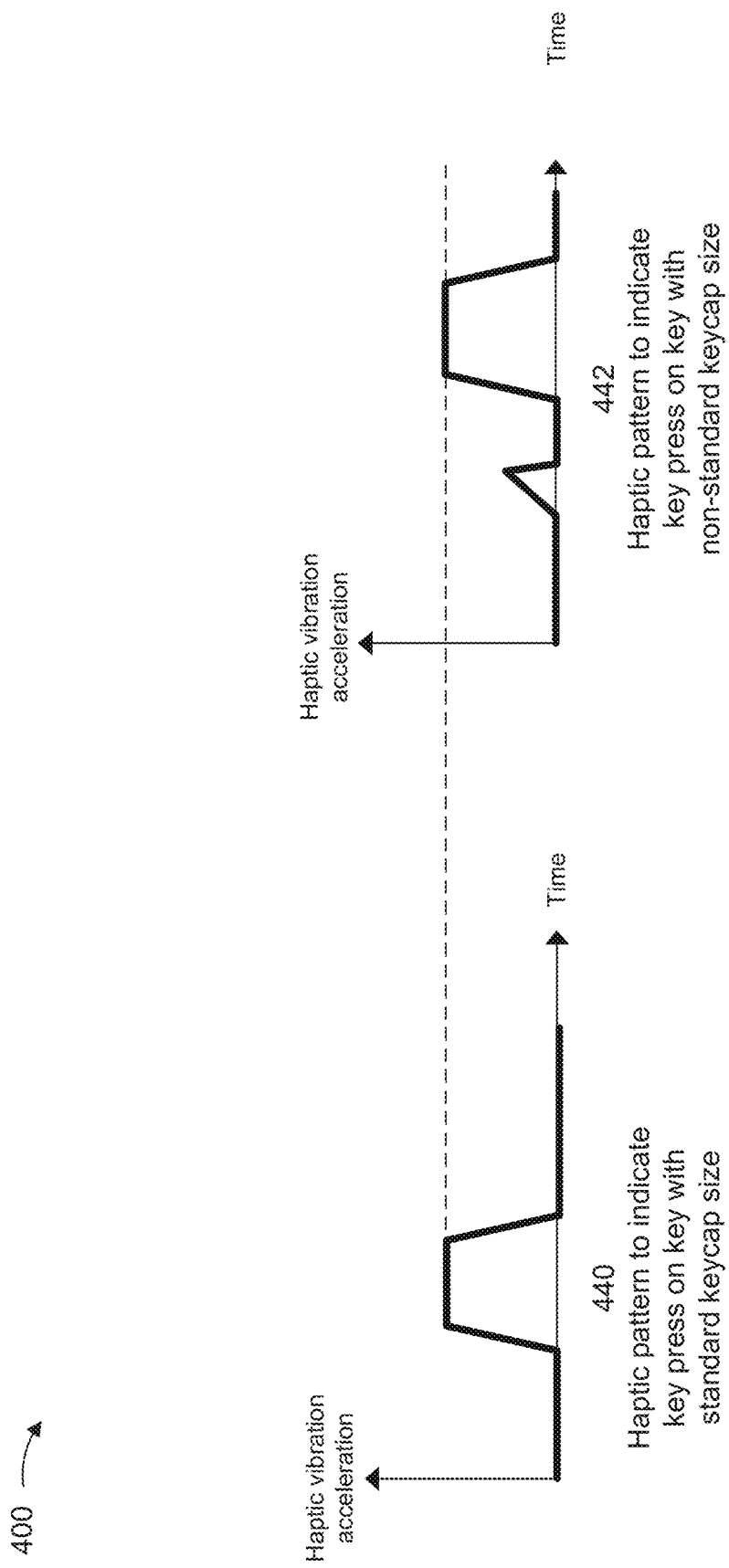

In another example, referring to FIG. 4D, reference numbers 440 and 442 depict different haptic patterns that may be generated to indicate or acknowledge selection of a special key, such as a shift key, a caps lock key, a tab key, a spacebar key, a return key, a backspace key, or the like. For example, as described herein, a special key may generally include any key that has a non-standard keycap size on the on-screen keyboard user interface or a physical keyboard device that is emulated or mimicked by the on-screen keyboard user interface. However, it will be appreciated that special keys that are associated with the haptic pattern depicted by reference number 442 may be defined or configured in other ways. As shown in FIG. 4D, reference number 440 depicts a baseline square or trapezoidal pulse that may be generated when a user presses a key other than a special key (e.g., an alphanumeric character or a punctuation key) when a special key is not active (e.g., shift and caps lock are off), which provides a tactile response with a sustained plateau (e.g., subject to potential variations depending on whether the key press was in the key center region and/or the amount of force applied when pressing the non-special key). Alternatively, reference number 442 depicts a vibration waveform that may be generated when the user presses a special key or a non-special key while a special key is active (e.g., shift and/or caps lock are on). In such cases, as shown by reference number 442, the vibration waveform may include a precursor pulse prior to the baseline square or trapezoidal pulse, where the precursor pulse has a maximum amplitude below the sustained plateau of the baseline square or trapezoidal pulse and a short duration (e.g., including a rise time that is longer than a fall time). In this way, the precursor pulse may provide a different tactile feel to the user when a special key is pressed or the key press occurs while a special key is active to indicate the current state of the keyboard user interface (e.g., guiding the user to prevent accidental activation of caps lock or shift, which may be especially important when typing password-related hidden fields or other case-sensitive information).

Figure 4E:
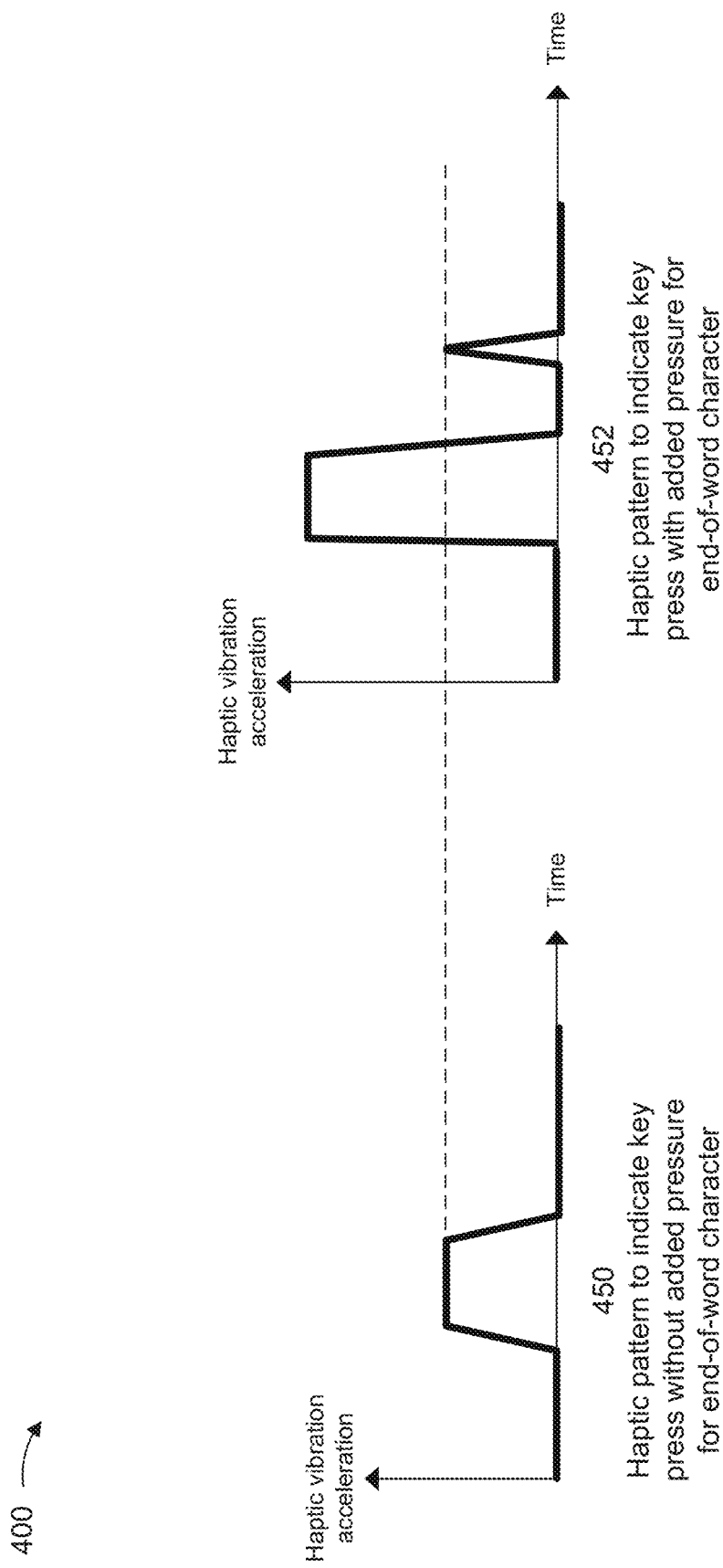

In another example, referring to FIG. 4E, reference numbers 450 and 452 depict haptic patterns that can be used to differentiate a key press that includes added force to indicate the final character in a word. For example, reference number 450 depicts a baseline square or trapezoidal pulse that may be generated when a user presses a key with normal force (e.g., when typing a character other than the last character in a word), and reference number 452 depicts a vibration waveform that may be generated when the user presses a key with additional force to indicate the final character in a word. For example, in some cases, an on-screen keyboard user interface may be associated with an auto-complete feature that suggests one or more words based on the sequence of characters that have been typed so far. However, in some cases, one word may be a subset of one or more words, which could potentially result in ambiguity or misleading auto-completion (e.g., the set of characters "play" is a word itself in addition to being a subset of "playground" and "player," among other examples). Accordingly, in some aspects, the keyboard user interface may provide the user with an option to apply additional force to indicate the final character in a word and automatically add a space at the end of the word, and reference number 452 depicts a haptic pattern that may be used to indicate or acknowledge the force press indicating the final character in a word. For example, as shown by reference number 452, the haptic pattern may include an initial portion where a square or trapezoidal pulse has a sustained plateau at a pulse maximum that exceeds the baseline amplitude used for a normal force and a subsequent post-cursor pulse with an amplitude equal to the baseline value (e.g., the post-cursor pulse provides additional tactile feedback to acknowledge the final letter in the word and the space added after the word).

In another example, referring to FIG. 4F, reference numbers 460 and 462 depict haptic patterns that can be used to indicate a key press-and-hold event, where a user presses a key and holds the key down, which can potentially result in accidentally typing many repeated letters (e.g., "eeeeeeeee . . ."). For example, reference number 460 depicts the baseline square or trapezoidal pulse that may be generated when a user presses a key with normal force and immediately lifts their finger, and reference number 462 depicts a vibration waveform that may be generated when the user presses a key and holds the key down for a sustained period. In this case, in addition to the baseline square or trapezoidal pulse, the vibration waveform to indicate the press-and-hold event may include one or more subsequent square or trapezoidal pulses with amplitudes that are lower than the amplitude of the initial pulse, which may be repeated periodically until a finger lift event occurs. For example, as shown by reference number 462, the subsequent square or trapezoidal pulses may be scaled down replicas of the initial baseline square or trapezoidal pulse that are used to indicate to the user that a key is being held down to help avoid unintended repetition of the pressed character.

As indicated above, FIGS. 4A-4F are provided as examples. Other examples may differ from what is described with regard to FIGS. 4A-4F.

Figure 5:
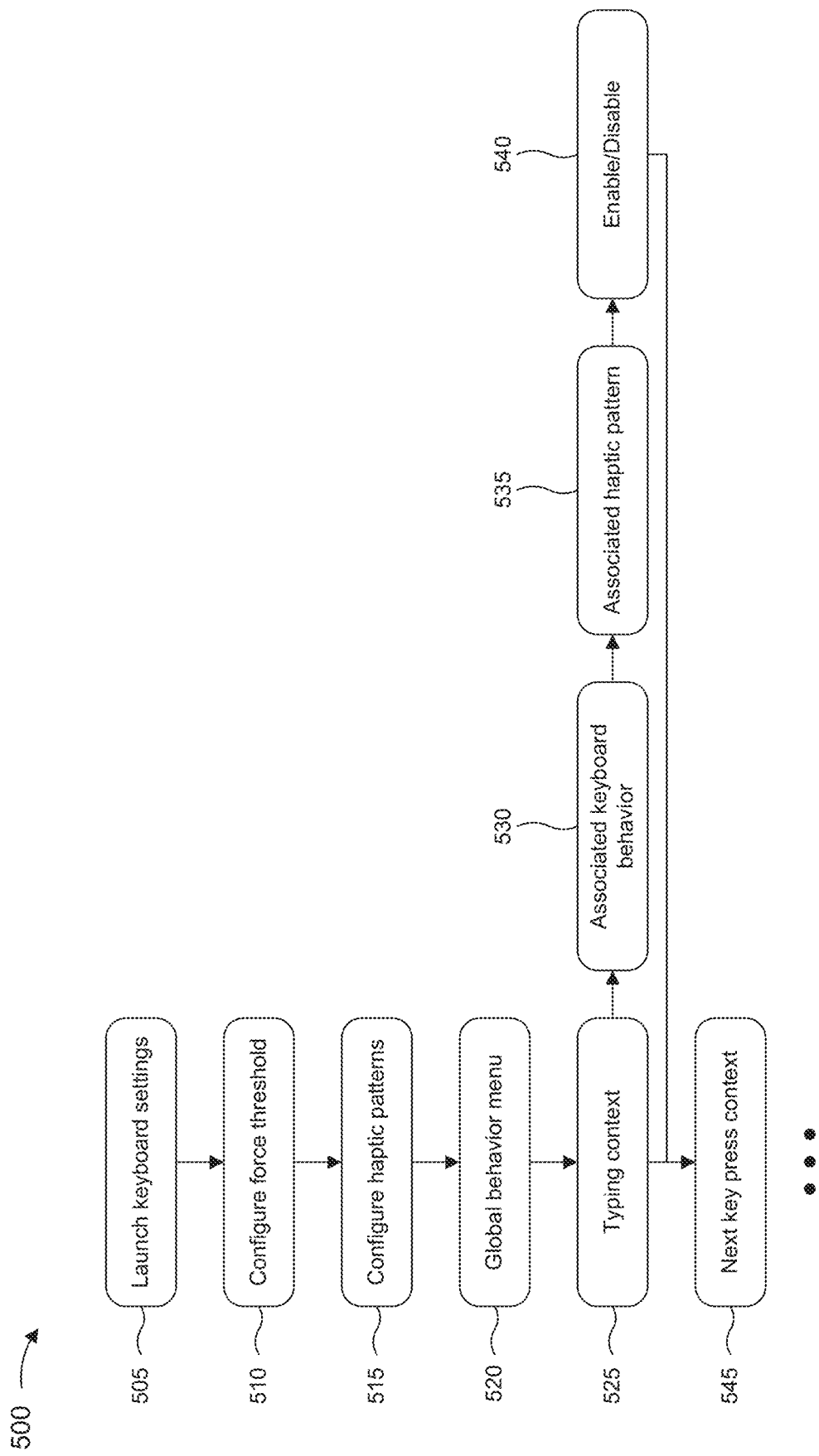
FIG. 5 is a diagram illustrating an example flow associated with configuring an on-screen keyboard user interface associated with context-aware haptic feedback, in accordance with the present disclosure.

FIG. 5 is a diagram illustrating an example flow 500 associated with configuring an on-screen keyboard user interface associated with context-aware haptic feedback, in accordance with the present disclosure.

For example, as shown by block 505, a user may select an option to launch or otherwise open a keyboard settings menu for the on-screen keyboard user interface (e.g., via a settings application associated with the electronic device, an app-specific keyboard settings menu, or the like). In some aspects, as shown by block 510, the keyboard settings menu may include an option to configure one or more force thresholds that are associated with the context-aware haptic feedback. For example, in block 510, the user may configure the range of force associated with a normal level of force and/or may configure the upper or lower bounds on the range to define presses with a low level or a high level of force. Additionally, or alternatively, the user may configure other force-related settings, such as the amount of force needed to indicate the final character in a word.

As further shown, in block 515, the keyboard settings menu may include an option to configure one or more haptic patterns. For example, in some aspects, the on-screen keyboard user interface may be associated with various default haptic patterns that can be associated with different typing contexts, such as the haptic patterns shown in FIGS. 4B-4F and described in further detail above. Additionally, or alternatively, the user may download additional haptic patterns and/or create one or more custom haptic patterns in block 515 (e.g., by tapping on the touchscreen display in a particular pattern, with or without a variable level of force). As further shown, in block 520, the keyboard settings menu may provide the user with an option to open a global behavior menu that allows the user to configure global behavior for one or more typing contexts.

For example, as shown by block 525, the global behavior menu may indicate a configurable typing context, which may be associated with various configurable settings. For example, as shown by block 530, a configurable typing context may be associated with corresponding keyboard behavior, such as toggling between lower and upper cases for the first letter in a word, adding a space if a current character is not the first letter in a new word, providing track-point word traversal for swipe keyboards that support suggesting words to auto-complete an in-progress swipe across the QWERTY keyboard, and/or defining a specific input key sequence for a local key mapping used to customize the meaning of a specific key. Furthermore, as shown by block 535, the global behavior menu may provide an option to associate each typing context with a corresponding haptic pattern that is generated or rendered when the typing context is detected. In addition, as shown by block 540, the global behavior menu may include a button or option to toggle the haptic feedback for the typing context between an enabled and disabled state. Accordingly, as shown by block 545, the user may traverse through the various typing contexts provided in the global behavior menu to configure the haptic pattern to be associated with various typing contexts and/or to enable or disable haptic feedback for the various typing contexts.

Although FIG. 5 shows example blocks of flow 500, in some aspects, flow 500 includes additional blocks, fewer blocks, different blocks, or differently arranged blocks than those depicted in FIG. 5. Additionally, or alternatively, two or more of the blocks of flow 500 may be performed in parallel.

Figure 6:
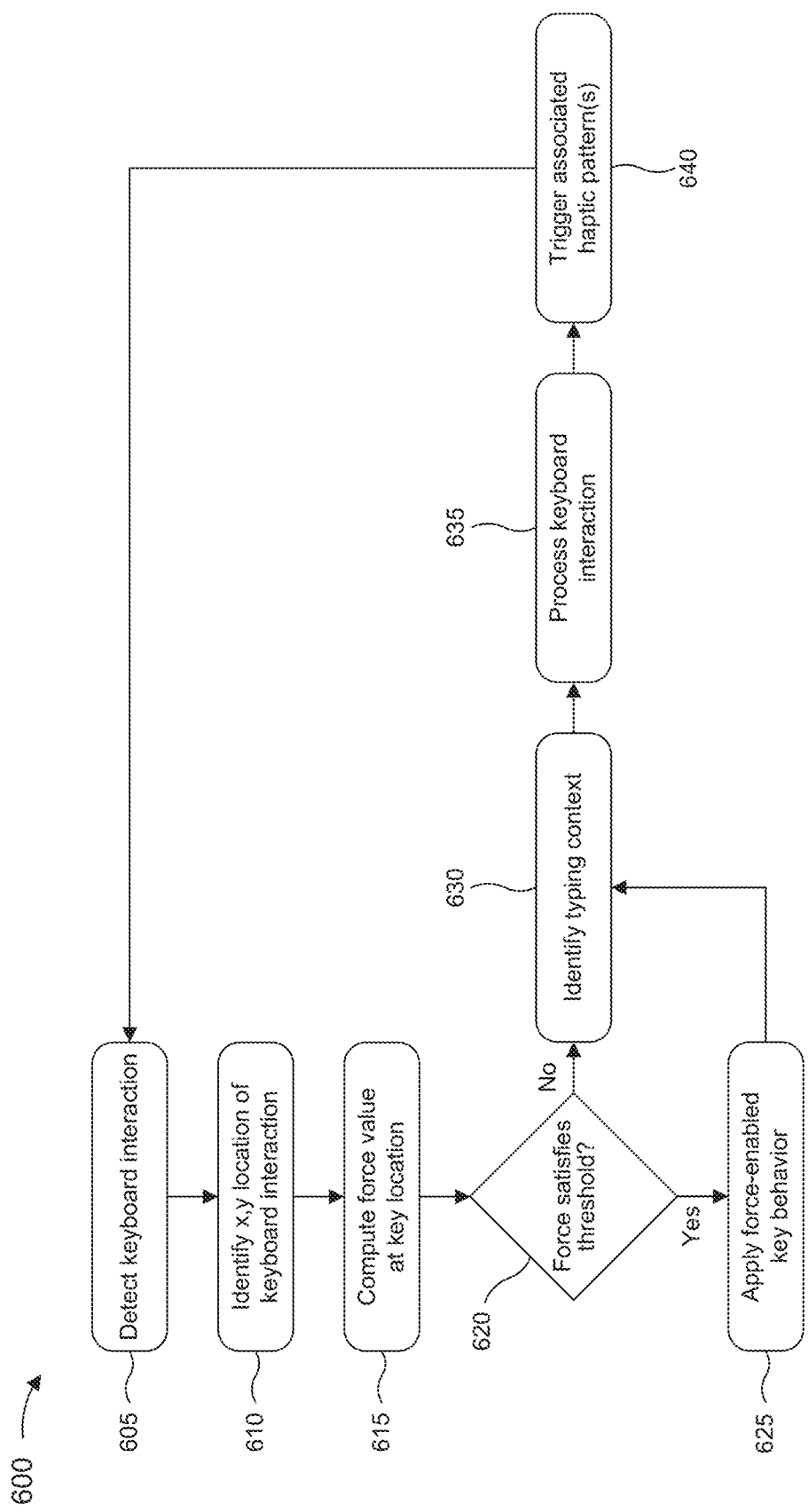
FIG. 6 is a diagram illustrating an example flow associated with applying context-aware haptic feedback for an on-screen keyboard user interface, in accordance with the present disclosure.

FIG. 6 is a diagram illustrating an example flow 600 associated with applying context-aware haptic feedback for an on-screen keyboard user interface, in accordance with the present disclosure.

For example, as shown by block 605, an electronic device may detect a keyboard interaction with an on-screen keyboard user interface that is displayed on the electronic device (e.g., in a messaging application, a notes application, a web browser application, or any other suitable application that accepts keyboard input). As further shown by block 610, the electronic device may determine a two-dimensional (e.g., x-y) location of the current keyboard interaction, and may map the two-dimensional location of the current keyboard interaction to a corresponding key. As further shown by block 615, the electronic device may compute a force value at the key location to determine whether the user pressed with a level of force in a normal range, a low level of force below the normal range, or a high level of force above the normal range. Accordingly, as shown by block 620, the electronic device may determine whether the level of force satisfies one or more thresholds (e.g., equals or exceeds an upper bound on the normal range, indicating a high level of force, or fails to equal or exceed a lower bound on the normal range, indicating a low level of force). In some aspects, as shown by block 625, the electronic device may apply force-enabled behavior in cases where the level of force satisfies one or more thresholds (e.g., is associated with a low or high level of force), examples of which are described above with reference to FIGS. 4A-4F.

As further shown by block 630, the electronic device may identify a typing context associated with the current keyboard interaction, and the keyboard interaction may be processed in block 635. For example, processing the keyboard interaction may include performing any keyboard behavior that may be associated with the typing context, such as toggling between lower and upper case for the first letter in a new word, adding a space after a character that is not the first letter in a new word, and/or computing an in-place track-point force and rotating between left and rights on suggested words using track-point information when there are suggested words available for a keyboard user interface that supports swiping to type. Furthermore, as shown by block 640, the electronic device may trigger one or more haptic actuators to generate a vibration waveform associated with a haptic pattern or a combination of multiple haptic patterns that corresponds to the current typing context. For example, the electronic device may trigger the haptic actuators to generate haptic feedback to indicate or acknowledge that the current typing context includes a key press in a boundary region between adjacent keys or a key edge region, a key press in a key center region, a key press selecting a special key or another key while a special key is active, a key press for the first letter in a new word, a key press other than the first letter in a new word, a key press or swipe when suggested words are available, a key press-and-hold interaction, and/or a key press with added pressure to indicate the final character in a word, among other examples.

Although FIG. 6 shows example blocks of flow 600, in some aspects, flow 600 includes additional blocks, fewer blocks, different blocks, or differently arranged blocks than those depicted in FIG. 6. Additionally, or alternatively, two or more of the blocks of flow 600 may be performed in parallel.

Figure 7:
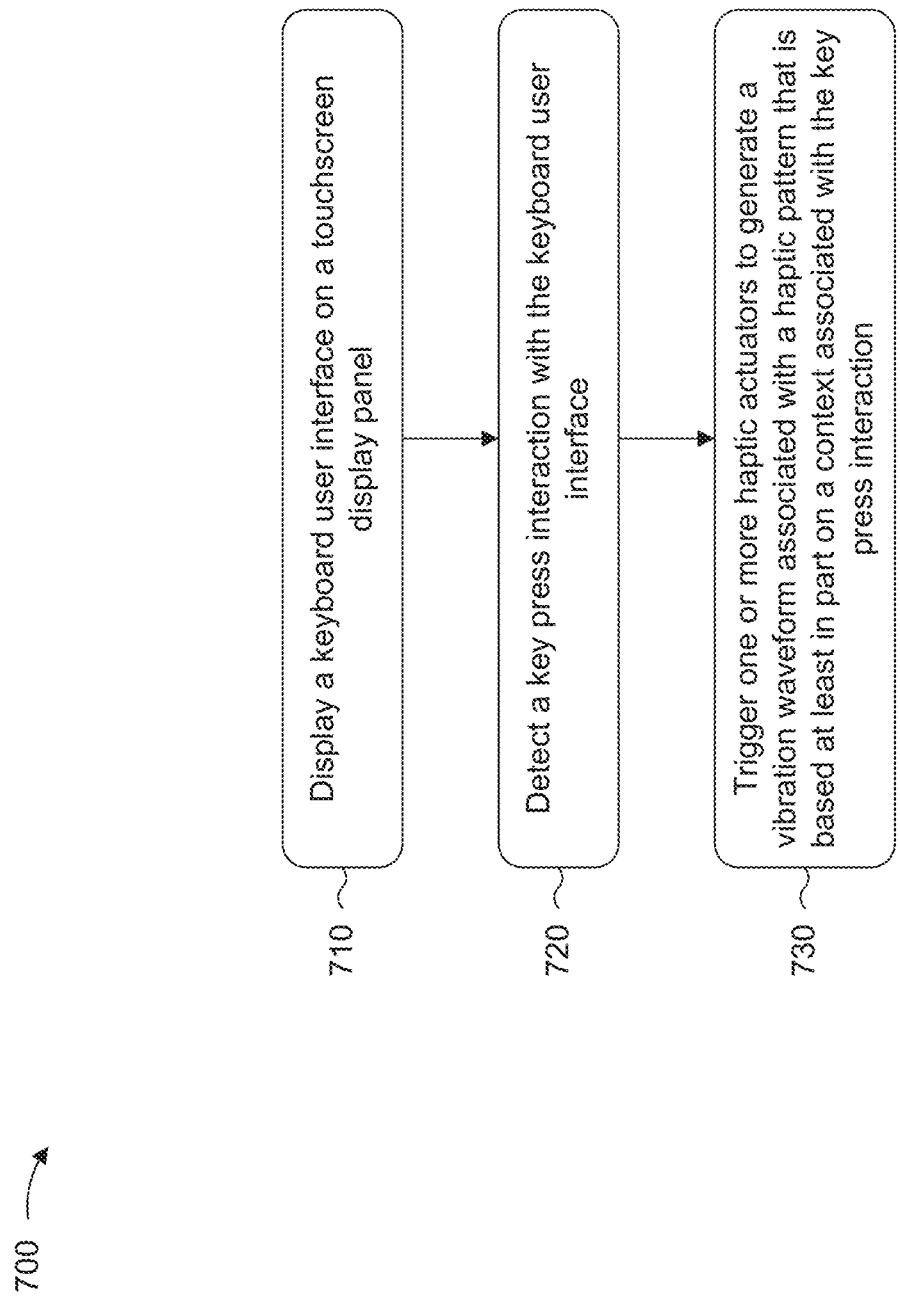
FIG. 7 is a flowchart of an example process associated with an on-screen keyboard user interface associated with context-aware haptic feedback, in accordance with the present disclosure.

FIG. 7 is a flowchart of an example process 700 associated with an on-screen keyboard user interface with context-aware haptic feedback. In some aspects, one or more process blocks of FIG. 7 are performed by an electronic device (e.g., electronic device 210). In some aspects, one or more process blocks of FIG. 7 are performed by another device or a group of devices separate from or including the electronic device. Additionally, or alternatively, one or more process blocks of FIG. 7 may be performed by one or more components of device 300, such as processor 310, memory 315, storage component 320, input component 325, output component 330, communication interface 335, sensor 340, actuator 345, and/or haptic feedback component 350.

As shown in FIG. 7, process 700 may include displaying a keyboard user interface on a touchscreen display panel (block 710). For example, the electronic device may display a keyboard user interface on a touchscreen display panel, as described above.

As further shown in FIG. 7, process 700 may include detecting a key press interaction with the keyboard user interface (block 720). For example, the electronic device may detect a key press interaction with the keyboard user interface, as described above.

As further shown in FIG. 7, process 700 may include triggering one or more haptic actuators to generate a vibration waveform associated with a haptic pattern that is based at least in part on a context associated with the key press interaction (block 730). For example, the electronic device may trigger one or more haptic actuators to generate a vibration waveform associated with a haptic pattern that is based at least in part on a context associated with the key press interaction, as described above.

Process 700 may include additional aspects, such as any single aspect or any combination of aspects described below and/or in connection with one or more other processes described elsewhere herein.

In a first aspect, the context associated with the key press interaction includes a key press in a key-center region.

In a second aspect, alone or in combination with the first aspect, the haptic pattern includes a square or trapezoidal pulse with a sustained plateau at a pulse maximum based at least in part on the context associated with the key press interaction including the key press in the key-center region.

In a third aspect, alone or in combination with one or more of the first and second aspects, the haptic pattern includes a precursor pulse with an amplitude below the pulse maximum based at least in part on the key-center region corresponding to a key that has a non-standard keycap size on one or more of the keyboard user interface or a physical keyboard emulated by the keyboard user interface.

In a fourth aspect, alone or in combination with one or more of the first through third aspects, the context associated with the key press interaction includes a key press in a key-edge region or a boundary region between adjacent keys.

In a fifth aspect, alone or in combination with one or more of the first through fourth aspects, the haptic pattern includes an initial rise to a pulse maximum and a subsequent decay to a lower sustained amplitude based at least in part on the context associated with the key press interaction including the key press in the key-edge region or the boundary region between adjacent keys.

In a sixth aspect, alone or in combination with one or more of the first through fifth aspects, process 700 includes measuring a force level associated with the key press interaction, wherein the vibration waveform has an amplitude that is based at least in part on the force level associated with the key press interaction.

In a seventh aspect, alone or in combination with one or more of the first through sixth aspects, the amplitude of the vibration waveform has a baseline value based on the force level being in a range, a value lower than the baseline value based on the force level being below the range, or a value higher than the baseline value based on the force level being above the range.

In an eighth aspect, alone or in combination with one or more of the first through seventh aspects, the context associated with the key press interaction includes a key press associated with a force level that indicates a final character in a word.

In a ninth aspect, alone or in combination with one or more of the first through eighth aspects, the haptic pattern includes a square or trapezoidal pulse with a sustained plateau at a pulse maximum that exceeds a baseline value and a subsequent post-cursor pulse an amplitude equal to the baseline value.

In a tenth aspect, alone or in combination with one or more of the first through ninth aspects, the context associated with the key press interaction includes a press-and-hold key press for a sustained duration.

In an eleventh aspect, alone or in combination with one or more of the first through tenth aspects, the haptic pattern includes an initial square or trapezoidal pulse with a sustained plateau at a pulse maximum and one or more subsequent square or trapezoidal pulses with sustained plateaus lower than the pulse maximum until a finger lift event occurs.

In a twelfth aspect, alone or in combination with one or more of the first through eleventh aspects, process 700 includes receiving, via a settings user interface, one or more user inputs to configure the haptic pattern for the context associated with the key press interaction.

In a thirteenth aspect, alone or in combination with one or more of the first through twelfth aspects, the one or more haptic actuators include multiple actuators that are each configured to generate a different component of the vibration waveform.

In a fourteenth aspect, alone or in combination with one or more of the first through thirteenth aspects, the context associated with the key press interaction includes a key press for an initial letter in a word.

In a fifteenth aspect, alone or in combination with one or more of the first through fourteenth aspects, the context associated with the key press interaction includes a key press for a letter other than a first letter in a word.

In a sixteenth aspect, alone or in combination with one or more of the first through fifteenth aspects, the context associated with the key press interaction includes an availability of one or more suggested words.

In a seventeenth aspect, alone or in combination with one or more of the first through sixteenth aspects, the haptic pattern includes a combination of multiple haptic patterns that are associated with the context associated with the key press interaction.

Although FIG. 7 shows example blocks of process 700, in some aspects, process 700 includes additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method performed by an electronic device, comprising: displaying a keyboard user interface on a touchscreen display panel; detecting a key press interaction with the keyboard user interface; and triggering one or more haptic actuators to generate a vibration waveform associated with a haptic pattern that is based at least in part on a context associated with the key press interaction.

Aspect 2: The method of Aspect 1, wherein the context associated with the key press interaction includes a key press in a key-center region.

Aspect 3: The method of Aspect 2, wherein the haptic pattern includes a square or trapezoidal pulse with a sustained plateau at a pulse maximum based at least in part on the context associated with the key press interaction including the key press in the key-center region.

Aspect 4: The method of Aspect 3, wherein the haptic pattern includes a precursor pulse with an amplitude below the pulse maximum based at least in part on the key-center region corresponding to a key that has a non-standard keycap size on one or more of the keyboard user interface or a physical keyboard emulated by the keyboard user interface.

Aspect 5: The method of any of Aspects 1-4, wherein the context associated with the key press interaction includes a key press in a key-edge region or a boundary region between adjacent keys.

Aspect 6: The method of Aspect 5, wherein the haptic pattern includes an initial rise to a pulse maximum and a subsequent decay to a lower sustained amplitude based at least in part on the context associated with the key press interaction including the key press in the key-edge region or the boundary region between adjacent keys.

Aspect 7: The method of any of Aspects 1-6, further comprising: measuring a force level associated with the key press interaction, wherein the vibration waveform has an amplitude that is based at least in part on the force level associated with the key press interaction.

Aspect 8: The method of Aspect 7, wherein the amplitude of the vibration waveform has a baseline value based on the force level being in a range, a value lower than the baseline value based on the force level being below the range, or a value higher than the baseline value based on the force level being above the range.

Aspect 9: The method of any of Aspects 1-8, wherein the context associated with the key press interaction includes a key press associated with a force level that indicates a final character in a word.

Aspect 10: The method of Aspect 9, wherein the haptic pattern includes a square or trapezoidal pulse with a sustained plateau at a pulse maximum that exceeds a baseline value and a subsequent post-cursor pulse an amplitude equal to the baseline value.

Aspect 11: The method of any of Aspects 1-10, wherein the context associated with the key press interaction includes a press-and-hold key press for a sustained duration.

Aspect 12: The method of Aspect 11, wherein the haptic pattern includes an initial square or trapezoidal pulse with a sustained plateau at a pulse maximum and one or more subsequent square or trapezoidal pulses with sustained plateaus lower than the pulse maximum until a finger lift event occurs.

Aspect 13: The method of any of Aspects 1-12, further comprising: receiving, via a settings user interface, one or more user inputs to configure the haptic pattern for the context associated with the key press interaction.

Aspect 14: The method of any of Aspects 1-13, wherein the one or more haptic actuators include multiple actuators that are each configured to generate a different component of the vibration waveform.

Aspect 15: The method of any of Aspects 1-14, wherein the context associated with the key press interaction includes a key press for an initial letter in a word.

Aspect 16: The method of any of Aspects 1-15, wherein the context associated with the key press interaction includes a key press for a letter other than a first letter in a word.

Aspect 17: The method of any of Aspects 1-16, wherein the context associated with the key press interaction includes an availability of one or more suggested words.

Aspect 18: The method of any of Aspects 1-17, wherein the haptic pattern includes a combination of multiple haptic patterns that are associated with the context associated with the key press interaction.

Aspect 19: An electronic device, comprising: a memory; and one or more processors, coupled to the memory, configured to: display a keyboard user interface on a touchscreen display panel; detect a key press interaction with the keyboard user interface; and trigger one or more haptic actuators to generate a vibration waveform associated with a haptic pattern that is based at least in part on a context associated with the key press interaction.

Aspect 20: The electronic device of Aspect 19, wherein the context associated with the key press interaction includes a key press in a key-center region.

Aspect 21: The electronic device of any of Aspects 19-20, wherein the context associated with the key press interaction includes a key press in a key-edge region or a boundary region between adjacent keys.

Aspect 22: The electronic device of any of Aspects 19-21, wherein the one or more processors are further configured to: measure a force level associated with the key press interaction, wherein the vibration waveform has an amplitude that is based at least in part on the force level associated with the key press interaction.

Aspect 23: The electronic device of any of Aspects 19-22, wherein the context associated with the key press interaction includes a key press associated with a force level that indicates a final character in a word.

Aspect 24: The electronic device of any of Aspects 19-23, wherein the context associated with the key press interaction includes a press-and-hold key press for a sustained duration.

Aspect 25: The electronic device of any of Aspects 19-24, wherein the context associated with the key press interaction includes a key press for an initial letter in a word.

Aspect 26: The electronic device of any of Aspects 19-25, wherein the context associated with the key press interaction includes a key press for a letter other than a first letter in a word.

Aspect 27: The electronic device of any of Aspects 19-26, wherein the context associated with the key press interaction includes an availability of one or more suggested words.

Aspect 28: The electronic device of any of Aspects 19-27, wherein the haptic pattern includes a combination of multiple haptic patterns that are associated with the context associated with the key press interaction.

Aspect 29: A non-transitory computer-readable medium storing a set of instructions, the set of instructions comprising: one or more instructions that, when executed by one or more processors of an electronic device, cause the electronic device to: display a keyboard user interface on a touchscreen display panel; detect a key press interaction with the keyboard user interface; and trigger one or more haptic actuators to generate a vibration waveform associated with a haptic pattern that is based at least in part on a context associated with the key press interaction.

Aspect 30: An apparatus, comprising: means for displaying a keyboard user interface on a touchscreen display panel; means for detecting a key press interaction with the keyboard user interface; and means for triggering one or more haptic actuators to generate a vibration waveform associated with a haptic pattern that is based at least in part on a context associated with the key press interaction.

Aspect 31: A system configured to perform one or more operations recited in one or more of Aspects 1-30.

Aspect 32: An apparatus comprising means for performing one or more operations recited in one or more of Aspects 1-30.

Aspect 33: A non-transitory computer-readable medium storing a set of instructions, the set of instructions comprising one or more instructions that, when executed by a device, cause the device to perform one or more operations recited in one or more of Aspects 1-30.

Aspect 34: A computer program product comprising instructions or code for executing one or more operations recited in one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by an electronic device, comprising:
displaying a keyboard user interface on a touchscreen display panel;

detecting a key press interaction with the keyboard user interface; and triggering one or more haptic actuators to generate a vibration waveform associated with a haptic pattern that is based at least in part on a location of the key press interaction and a force value of the key press interaction at the location, wherein the vibration waveform is based at least in part on:

whether the location of the key press interaction is on a key-center region, on a key-edge region, or on a boundary region between keys, whether the force value is within a range, above the range, or below the range, whether the key press interaction is associated a key having a standard keycap size or a non-standard keycap size, or whether the key press interaction is associated with a force level that indicates a final character of a word.

2. The method of claim 1, wherein the key press interaction includes a key press in the key-center region.

3. The method of claim 2, wherein the haptic pattern includes a square or trapezoidal pulse with a sustained plateau at a pulse maximum based at least in part on the key press being in the key-center region.

4. The method of claim 3, wherein the haptic pattern includes a precursor pulse with an amplitude below the pulse maximum based at least in part on the key-center region corresponding to a key that has the non-standard keycap size on one or more of the keyboard user interface or a physical keyboard emulated by the keyboard user interface.

5. The method of claim 1, wherein the key press interaction includes a key press in the key-edge region or the boundary region.

6. The method of claim 5, wherein the haptic pattern includes an initial rise to a pulse maximum and a subsequent decay to a lower sustained amplitude based at least in part on the key press being in the key-edge region or the boundary region between adjacent keys.

7. The method of claim 1, further comprising:

measuring the force value, wherein the vibration waveform has an amplitude that is based at least in part on the force value.

8. The method of claim 7, wherein the amplitude of the vibration waveform has a baseline value based on the force value being in the range, a value lower than the baseline value based on the force value being below the range, or a value higher than the baseline value based on the force value being above the range.

9. The method of claim 1, wherein the key press interaction includes a key press associated with the force level that indicates a final character in a word.

10. The method of claim 9, wherein the haptic pattern includes a square or trapezoidal pulse with a sustained plateau at a pulse maximum that exceeds a baseline value and a subsequent post-cursor pulse an amplitude equal to the baseline value.

11. The method of claim 1, wherein the key press interaction includes a press-and-hold key press for a sustained duration.

12. The method of claim 11, wherein the haptic pattern includes an initial square or trapezoidal pulse with a sustained plateau at a pulse maximum and one or more subsequent square or trapezoidal pulses with sustained plateaus lower than the pulse maximum until a finger lift event occurs.

13. The method of claim 1, further comprising:

receiving, via a settings user interface, one or more user inputs to configure the haptic pattern for the key press interaction.

14. The method of claim 1, wherein the one or more haptic actuators include multiple actuators that are each configured to generate a different component of the vibration waveform.

15. The method of claim 1, wherein the key press interaction includes a key press for an initial letter in a word.

16. The method of claim 1, wherein the key press interaction includes a key press for a letter other than a first letter in a word.

17. The method of claim 1, wherein a context associated with the key press interaction includes an availability of one or more suggested words.

18. The method of claim 1, wherein the haptic pattern includes a combination of multiple haptic patterns that are associated with the key press interaction.

19. An electronic device, comprising:

memory; and one or more processors, coupled to the memory, configured to:

display a keyboard user interface on a touchscreen display panel;

detect a key press interaction with the keyboard user interface; and trigger one or more haptic actuators to generate a vibration waveform associated with a haptic pattern that is based at least in part on a location of the key press interaction and a force value of the key press interaction at the location, wherein the vibration waveform is based at least in part on:

whether the location of the key press interaction is on a key-center region, on a key-edge region, or on a boundary region between keys, whether the force value is within a range, above the range, or below the range, whether the key press interaction is associated a key having a standard keycap size or a non-standard keycap size, or whether the key press interaction is associated with a force level that indicates a final character of a word.

20. The electronic device of claim 19, wherein the key press interaction includes a key press in the key-center region.

21. The electronic device of claim 19, wherein the key press interaction includes a key press in the key-edge region or the boundary region.

22. The electronic device of claim 19, wherein the one or more processors are further configured to:

measure the force value, wherein the vibration waveform has an amplitude that is based at least in part on the force value.

23. The electronic device of claim 19, wherein the key press interaction includes a key press associated with the force level that indicates a final character in a word.

24. The electronic device of claim 19, wherein the key press interaction includes a press-and-hold key press for a sustained duration.

25. The electronic device of claim 19, wherein the key press interaction includes a key press for an initial letter in a word.

26. The electronic device of claim 19, wherein the key press interaction includes a key press for a letter other than a first letter in a word.

27. The electronic device of claim 19, wherein a context associated with the key press interaction includes an availability of one or more suggested words.

28. The electronic device of claim 19, wherein the haptic pattern includes a combination of multiple haptic patterns that are associated with the key press interaction.

29. A non-transitory computer-readable medium storing a set of instructions, the set of instructions comprising:
- one or more instructions that, when executed by one or more processors of an electronic device, cause the electronic device to:
  - display a keyboard user interface on a touchscreen display panel;
  - detect a key press interaction with the keyboard user interface; and
  - trigger one or more haptic actuators to generate a vibration waveform associated with a haptic pattern that is based at least in part on a location of the key press interaction and a force value of the key press interaction at the location, wherein the vibration waveform is based at least in part on:
    - whether the location of the key press interaction is on a key-center region, on a key-edge region, or on a boundary region between keys,
    - whether the force value is within a range, above the range, or below the range,
    - whether the key press interaction is associated a key having a standard keycap size or a non-standard keycap size, or
    - whether the key press interaction is associated with a force level that indicates a final character of a word.

30. An apparatus, comprising:
- means for displaying a keyboard user interface on a touchscreen display panel;
- means for detecting a key press interaction with the keyboard user interface; and
- means for triggering one or more haptic actuators to generate a vibration waveform associated with a haptic pattern that is based at least in part on a location of the key press interaction and a force value of the key press interaction at the location, wherein the vibration waveform is based at least in part on:
  - whether the location of the key press interaction is on a key-center region, on a key-edge region, or on a boundary region between keys,
  - whether the force value is within a range, above the range, or below the range,
  - whether the key press interaction is associated a key having a standard keycap size or a non-standard keycap size, or
  - whether the key press interaction is associated with a force level that indicates a final character of a word.

\* \* \* \* \*